Sept. 1, 1964    L. O. PATERSON    3,147,219
PROCESS OF DISINFECTING WATER
Filed June 14, 1961

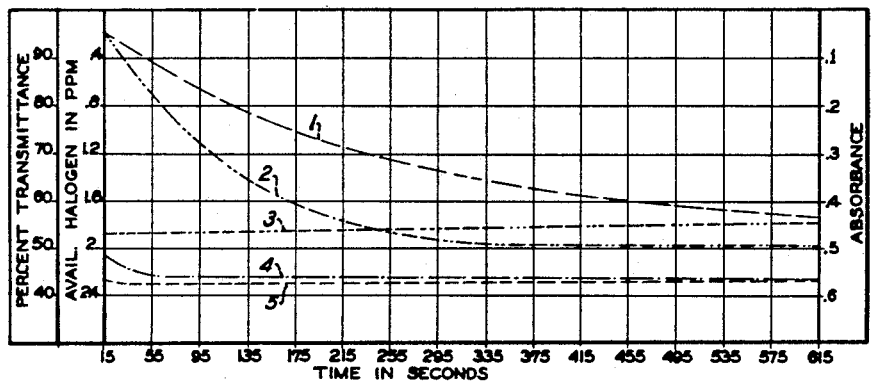

RATE OF ORTHO-TOLIDINE COLOR DEVELOPMENT WITH VARIOUS N-HALOGENATED DIMETHYLHYDANTOINS CURVES AS RECORDED ON B&L SPECTRONIC 505

Fig. 1

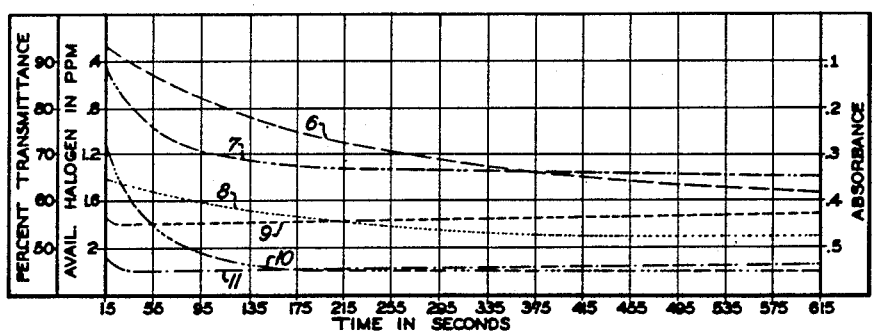

RATE OF ORTHO-TOLIDINE COLOR DEVELOPMENT WITH VARIOUS N-HALOGENATED SUCCINIMIDES AS RECORDED ON A B&L SPECTRONIC 505

Fig. 2

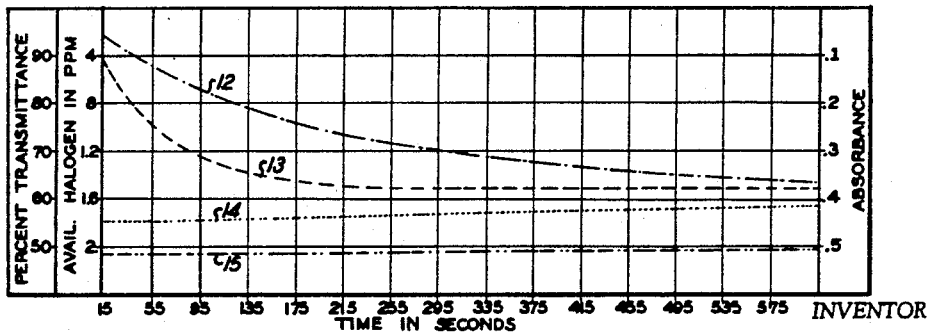

RATE OF ORTHOTOLIDINE COLOR DEVELOPMENT WITH VARIOUS SODIUM N-HALOGENATED CYANURATES AS RECORDED ON B&L SPECTRONIC 505

Fig. 3

INVENTOR
LAURENE O. PATERSON
BY
ATTORNEY

United States Patent Office 3,147,219
Patented Sept. 1, 1964

3,147,219
PROCESS OF DISINFECTING WATER
Laurene O. Paterson, 1219 E. Church St., Adrian, Mich.
Filed June 14, 1961, Ser. No. 126,403
27 Claims. (Cl. 210—62)

This invention relates to an improved method of water disinfection, and more particularly to the use of N-halogenated organic compounds which provide both active bromine and active chlorine for the purpose.

In a broad aspect of the invention, water is disinfected by treating it with N-halogenated organic compounds which release both active bromine and active chlorine. These halogens may be supplied as components of a single multi-N-halogenated organic compound or as a mixture of an N-chlorinated organic compound with an N-brominated organic compound.

The N-halogenated organic compounds have certain properties which make them a desirable source of halogen for disinfecting water. They are solids which show good stability in the dry form, are safe to handle, and may contain high percentages of active halogen. The use of the N-halogenated organic compounds in the form of low solubility agglomerates for water disinfection is described in my co-pending application Serial No. 6,052 of which this application is a continuation-in-part.

N-chlorinated compounds such as N-chlorosuccinimide, N,N-dichloro-dimethylhydantoin and sodium and potassium N,N-dichlorocyanurate are comercially available and are presently being used to disinfect water. The N-chlorinated compounds act much as chloramines in that they do not readily release "active chlorine" in water. They must be used in high dosage to provide effective bactericidal control.

Recently the N-brominated organic compounds have become available. These materials ionize in water very rapidly to release "active bromine." However, their relatively high expense and low water solubility have prevented any substantial usage as water disinfectants.

In U.S. Patents Nos. 2,779,764 and 2,868,787, the preparation of a series of N-halogenated organic compounds containing both bromine and chlorine is described. Quite unexpectedly it has been found that these compounds are superior to those containing all bromine as disinfectants for water. They not only release active bromine rapidly and completely in water, but the chlorine component is equally available as a bactericide. They are very effective in low concentration, and, more important, their bactericidal activity is not affected by protein contamination in the water. The fact that the N-chloro radical may constitute a high percentage of the total halogen makes them relatively inexpensive to use.

It has been further found that N-chlorinated organic compounds in admixture with N-brominated organic compounds have similar disinfecting properties to those containing bromine and chlorine as components of the same molecule.

Accordingly, it is an object of the present invention to provide superior disinfecting compositions containing N-halogenated organic compounds releasing both active bromine and active chlorine in water.

It is a further object to provide a disinfecting means for water wherein substantially all the halogen assumes a "free" or "active" form, and thereby has rapid bactericidal activity.

The N-halogenated organic compounds or mixtures of compounds finding application in the invention must provide at least one N-bromo-radical and one N-chloro-radical, and may contain additonal N-bromo- and N-chloro-groups.

Generally the N-halogenated organc compounds suitble for use herein may be classified as derivatives of amines, amides, imides, amidines, and imidates. They usually contain at least one radical included in the following typical structures:

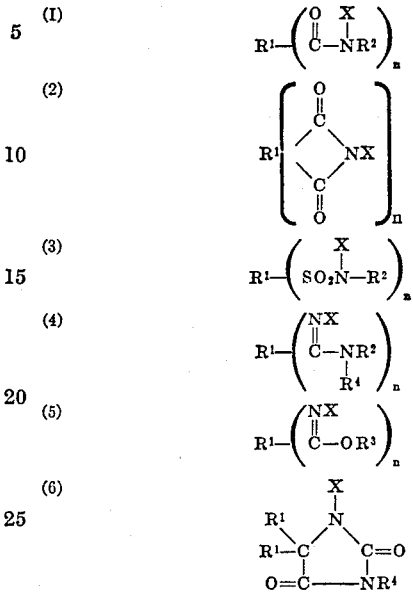

In these formulae $R^1$ is a 1 to 16 carbon atom mono- or multivalent hydrocarbon radical of the group consisting of alkyl and saturated and unsaturated monocyclic hydrocarbon radicals having 5 or 6 carbon atoms per cycle, all of which radicals may be substituted with lower alkyl, lower alkoxy, lower acyl, halogen, carboxy and sulfonic acid groups; $R^2$ may be hydrogen, lower alkyl, lower acyl or monocyclic aryl radical having 5 or 6 carbon atoms per cycle, of which the aryl radical can be substituted with lower alkyl, lower acyl, halogen, carboxy or sulfonic acid groups; $R^3$ may be lower alkyl, or monocyclic aryl radical having 5 or 6 carbon atoms per cycle; $R^4$ may be hydrogen, lower alkyl, lower acyl or halogen; X may be either chlorine or bromine; $n$ is an integer from 1 to 4.

In the above formulae where $R^1$ is a monovalent radical there are included such radicals as

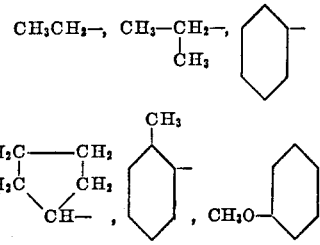

and the like; where $R^1$ is a multivalent radical there are included such radicals as

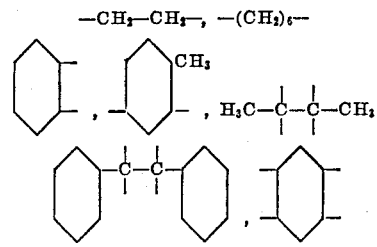

and the like. In Formula 6 $R^1$ may take the form of a multimethylene radical containing 3 to 6 carbon atoms to form a 5-spiro hydantoin.

Where $R^1$ is substituted with halogen, such halogen may be chlorine, bromine, iodine, and fluorine. The following radicals are typical:

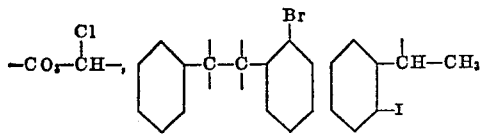

Where R¹ is substituted with a carboxy or sulfonic acid group, typical examples are

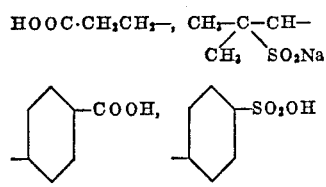

and the like.

By the term "lower," radicals having up to 6 carbon atoms are contemplated. Typical of lower alkyl, such radicals as methyl, ethyl, chloro-propyl, tertiary butyl, isoamyl, secondary hexyl and the like are meant; by the term lower acyl such radicals as formyl, acetyl, butyryl, benzoyl and the like are meant. Where the compounds are acidic due to the presence of a carboxy, sulfonic or "positive" halogen radical they may have preferred use in the form of their salts. Where the N-halogenated organic compounds tend to be inherently basic due to the presence of a free amino group or groups such compounds may be isolated in the form of their acid-addition salts. X represents the "active" halogen, which may be either bromine or chlorine. Where the term N-mixed halogen is used it indicates that both bromine and chlorine are present in the molecule.

Formula 1 represents the N-halogenated acid amides such as N-chloroacetamide, N,N¹-dichlorosuccindiamide, N,N¹-dichloro-2-chloro-N,N¹-dimethyl-adipic-diamide, N-chloro-N-methyl-benzamide, N,N¹-dichloro-phthalic-diamide, N,N¹-dichloro-2-methoxy-N,N¹-dimethyl-terephthalic-diamide, and their corresponding N-bromo-derivatives and N-mixed halogen derivatives where these may exist. Special compounds of this class are the dilower alkyl N,N-alpha, alpha-tetra-chloro-malonamides, and the N-bromo- and N-mixed-halogen- derivatives.

Formula 2 represents the N-halogenated imides such as N-chloro-succinimide, N-chloro-phthalimide, N,N¹-dichloro-pyromellitic diimide and N,N¹-dichloro-bicycloazole-2,5-dione having the structure

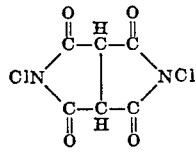

and the like, and the corresponding N-bromo- and N-mixed halogen derivatives where these may exist.

Formula 3 represents the N-halogenated sulfonamides such as sodium N-chloro-benzenesulfonamide, sodium N-chloro-toluene-sulfonamide, p,-N,N-dichloro-sulfamyl benzoic acid, N,N¹-dichloro-toluene-2,4-disulfonamide and the corresponding N-bromo- and N-mixed halogen derivatives where these may exist.

Formula 4 represents the N-halogenated amidines such as N-chloro-benzamidine, N,N-dichloro-N,N-dimethyl-succindiiamidine having the structure

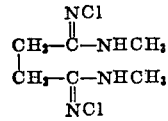

and the like, and their corresponding N-bromo- and N-mixed halogen derivatives, and acid-addition salts thereof.

Closely related to the above class of compounds are the amidines of carbonic acid. Typical derivatives are the N-chlorinated-N-tetra-methyl-substituted biguanides such as

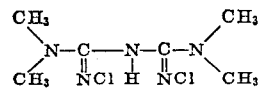

and N,N¹-dichloro-azodicarbonamidine-hydrochloride.

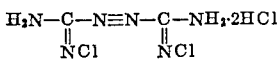

and their corresponding N-bromo- and N-mixed halogen derivatives. Another type of compound closely related to this class is the N-halogenated-2,5-imino-glycolurils, as for example N¹, N³, N⁴, N⁶-tetra-chloro-2,5-diimino-7,8-dimethyl-glycoluril and the corresponding N-bromo- and N-mixed halogen derivatives.

Formula 5 represents the N-halogenated imidates such as N-chloro-phenyl-propionimidate

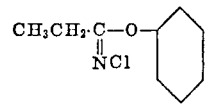

and

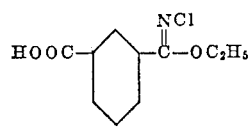

and the like, and their corresponding N-bromo- and N-mixed halogen derivatives.

Formula 6 represents the N-mono- and N,N-dihalogenated 5-substituted hydantoins such as N-monochloro-5-ethyl-5-methyl-hydantoin, N,N¹-dichloro-5-pentamethylene-hydantoin, N,N¹-dichloro-5-carboxy-ethyl-5-methyl-hydantoin, and 5-substituted alkyl-substituted hydantoins having the structure

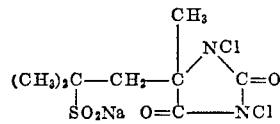

and the like, and the corresponding N-bromo- and N-mixed halogen derivatives.

Another class of compounds which has wide application as N-halogen carriers are the N-substituted ureas and urea derivatives. As typical derivatives may be selected N,N¹-dichloro-diacetyl urea, N,N-dichloro-cyanuric acid, N¹,-N³,N⁴-trichloro-7,8-diphenyl-glycoluril, N¹,N²,N³-trichloro-N,N³-dimethyl biuret and the like, and the corresponding N-bromo- and N-mixed halogen derivatives. The N-halogenated melamines, such as N¹,N²,N³-trichloro-melamine, are also suitable for the purpose.

A special type of N-halogenated organic compound which has shown merit is the N-tetra-brominated and N-mixed-brominated-chlorinated triethylene diamines.

When salts are used they may be of the alkali metals such as sodium, potassium, and lithium, or of the alkaline earth metals such as calcium or magnesium. The iron, aluminum, tin, and zinc salts are also of value. Typical compounds which may be used are sodium N,N¹-dichloro-cyanurate, potassium N,N¹-dichloro-toluene-2,4-disulfonamide, their bromine and N-mixed halogen counterparts.

To demonstrate the enhanced bactericidal activity of disinfecting compositions providing both N-bromo- and N-chloro-radicals over those containing bromine or chlorine alone, a series of representative compounds and mixtures of compounds containing these halogens were evaluated by several means.

Although the mechanism by which halogen kills bacteria has not been established with certainty, it is believed to involve an oxidation process. The leuco dyestuff orthotolidine is oxidized by active halogen to a quinoid structure which assumes a yellow color in water. Such color development is widely used in the field to measure both chlorine and bromine residuals. Values as determined in this manner have been found to closely parallel the bactericidal activity of chlorine- or bromine-treated waters. When chlorine is added to water a portion is consumed in the oxidation of inorganic and organic contaminants, a portion reacts with inorganic alkaline salts or N-containing organic impurities to form "combined" halogen and the balance reacts with water to form free hypochlorous ions. The free hypochlorous ion content of the water is commonly referred to as the "free chlorine residual." It is chlorine in this form which is immediately available for killing bacteria. Hypochlorous ion produces with ortho-tolidine reagent a "flash" color development, which value is of greatest significance in evaluating the rapidity of bacterial kill in chlorine-treated waters.

The "combined" chlorine may take the form of alkali hypochlorites, alkaline earth hypochlorites, the chloramines, or may exist as N-chlorinated protein bodies. These materials release chlorine but slowly to water, such rate being determinable by the speed of ortho-tolidine color development. The intensity of the ortho-tolidine color at the point of maximum development represents the "total residual chlorine" in the water. Bromine produces with ortho-tolidine a color of the same spectral characteristics as chlorine. Considering the difference in atomic weight, the intensity of such color development is the same as with chlorine.

Using a Bausch and Lomb Spectronic 505 recording spectrophotometer, a study was made of the rate of ortho-tolidine color development with water samples containing various of the N-halogenated organic compounds. Comparison was made of those providing chlorine alone, bromine alone, and both halogens in admixture. It was found that about 15 seconds were required to mix the reagents and insert the curvette into the instrument. This increment of time was considered to correspond to the "flash" reading with ortho-tolidine and to thus represent the "free halogen" residual. Water used in the preparation of all samples was doubly distilled from acid permanganate to remove any ammonia or oxidizable residue. However, water as derived from a contaminated source would always contain inorganic or organic impurities which would react with and consume halogen. For this reason, duplicate determinations were made using water to which 30 p.p.m. of peptone had been added.

FIG. 1, FIG. 2, and FIG. 3 represent a series of typical curves showing the rate of active halogen release for several of the N-halogenated organic compounds as measured by ortho-tolidine color development. The wavelength setting on the Spectronic 505 was 439 mu.

FIG. 1 plots the rate of the ortho-tolidine color development with various of the N-halogenated dimethyl hydantoins. FIG. 2 plots the rate of the ortho-tolidine color development with N-chloro-succinimide, with N-bromo-succinimide and with these two compounds in equimolar admixture. FIG. 3 plots the rate of the ortho-tolidine color development with various of the N-halogenated cyanurates. It is to be noted that the curves were developed over a time interval of 10 minutes. The "total halogen residual" as determined by the color development at the end of the 10-minute interval varied between 1.41 and 2.28 p.p.m. It had been previously determined that color readings within this range obeyed Beer's law. For purposes of comparison, all halogen readings are reported in terms of bromine.

The curves are numbered 1 through 15. The N-halogenated constituent or constituents under study are listed and identified in Table 1. For purposes of easy comparison, the numerical values in the table represent the amount of color development at the given time as a percentage of the total color developed for that compound within the 10-minute time interval. In effect, these values represent the percentage of the "total available halogen" in the form of a "free halogen residual" in the water at the given time, and thereby reflect the rapidity of the bactericidal action which might be expected from any given compound or compounds.

A study of the curves in FIG. 1, FIG. 2, and FIG. 3 confirms a slow release of "active" chlorine to water from an N-chlorinated organic compound. With the N-brominated organic carriers the ortho-tolidine color development was almost complete within 15 seconds. With water samples containing N-halogenated organic compounds or mixtures of compounds releasing both active bromine and active chlorine the ortho-tolidine color development was also rapid, even in the presence of protein contamination.

TABLE I.—RATE PERCENT OF ORTHO-TOLIDINE COLOR DEVELOPMENT WITH DISINFECTED WATER CONTAINING VARIOUS N-HALOGENATED ORGANIC COMPOUNDS

| Curve No. | N-Halogenated Organic Compound | Total Res. Hal., p.p.m.[1] | Time in Seconds | | | | | | |
|---|---|---|---|---|---|---|---|---|---|
| | | | 15 | 30 | 60 | 120 | 240 | 360 | 480 |
| | | | Percent | Percent | Percent | Percent | Percent | Percent | Percent |
| 1 | N,N-dichloro-dimethyl-hydantoin under protein demand.[2] | 1.76 | 10.2 | 16.0 | 25.0 | 44.0 | 68.0 | 83.0 | 93.0 |
| 2 | N,N-dichloro-dimethyl-hydantoin | 1.97 | 10.2 | 21.0 | 38.0 | 67.0 | 92.4 | 99.0 | 100 |
| 3 | N,N-dibromo-dimethyl-hydantoin | 1.82 | 100 | | | | | | |
| 4 | N-bromo-N-chloro-dimethyl-hydantoin | 2.27 | 95.0 | 98.0 | 99.0 | 100 | | | |
| 5 | N-bromo-N-chloro-dimethyl-dydantoin under protein demand.[2] | 2.28 | 99.1 | 100 | | | | | |
| 6 | N-chloro-succinimide under protein demand.[2] | 1.55 | 21.0 | 26.0 | 35.0 | 53.0 | 75.0 | 90.0 | |
| 7 | N-chloro-succinimide | 1.41 | 32.0 | 51.0 | 71.0 | 87.0 | 97.0 | 100 | |
| 8 | N-bromo-succinimide+N-chloro-succinimide | 1.92 | 74.0 | 77.0 | 82.0 | 87.0 | 95.0 | 99.0 | 100 |
| 9 | N-bromo-succinimide under protein demand.[2] | 1.80 | 100 | | | | | | |
| 10 | N-bromo-succinimide+N-chloro-succinimide under protein demand.[2] | 2.20 | 50.0 | 67.0 | 85.0 | 96.0 | 100 | | |
| 11 | N-bromo-succinimide | 2.20 | 95.0 | 100 | | | | | |
| 12 | Sodium-N-dichloro-cyanurate under protein demand.[2] | 1.46 | 16.0 | 22.0 | 34.0 | 53.0 | 75.0 | 88.0 | 95.0 |
| 13 | Sodium N-dichloro-cyanurate | 1.53 | 26.0 | 44.0 | 65.0 | 89.0 | 97.0 | 100 | |
| 14 | Sodium N-bromo-N-chloro-cyanurate under protein demand.[2] | 1.80 | 100 | | | | | | |
| 15 | Sodium N-bromo-N-chloro-cyanurate | 2.16 | 100 | | | | | | |

[1] Total residual halogen determined from graph after time interval of 615 seconds.
[2] 30 p.p.m. of peptone added to water prior to addition of N-halogenated compound.

To correlate the rate of ortho-tolidine color development with actual bactericidal activity, a series of test organisms were subjected to the action of various of the N-halogenated organic compounds. Values as obtained with the N-halogenated dimethylhydantoins using the various bacteria are listed in Table II. All the halogen test solutions were prepared to contain 1 p.p.m. total residual halogen as read on an ortho-tolidine test kit calibrated for bromine. In all instances the pH of the test halogen solution in the seeding pot was 7.1.

genic, but which represented broad classes of pathogenic organisms which might be found in contaminated waters.

TABLE II.—STANDARD PLATE COUNT OF SURVIVING BACTERIA

[pH—7.1; temp.—25° C.; total residual halogen—1 p.p.m. as read with ortho-tolidine kit calibrated for bromine]

| Bacterium | Initial Count/ml. | Exposure Time in Seconds | | | |
|---|---|---|---|---|---|
| | | 15 | 30 | 60 | 120 |
| COMPOUND: SODIUM HYPOCHLORITE | | | | | |
| E. coli | 110,000 | 690 | 40 | 5 | 20 |
| COMPOUND: SODIUM HYPOCHLORITE UNDER PROTEIN DEMAND (30 P.P.M.-PEPTONE) | | | | | |
| E. coli | 110,000 | TNTC | TNTC | 320 | 260 |
| COMPOUND: N,N-DICHLORO-DIMETHYL-HYDANTOIN | | | | | |
| E. coli | 150,000 | TNTC | TNTC | TNTC | TNTC |
| Bucal Streptococcus | 165,000 | TNTC | TNTC | TNTC | TNTC |
| Bacillus subtilis | 250,000 | TNTC | TNTC | TNTC | TNTC |
| Pseudomonas fluorescens | 160,000 | TNTC | TNTC | TNTC | TNTC |
| Streptococcus lactis | 105,000 | 45 | 21 | 5 | 1 |
| COMPOUND: N,N-DIBROMO-DIMETHYL-HYDANTOIN | | | | | |
| E. coli | 150,000 | 321 | 241 | 176 | 85 |
| Bucal streptococcus | 165,000 | TNTC | 196 | 201 | 62 |
| Bacillus subtilis | 250,000 | TNTC | TNTC | 324 | 250 |
| Pseudomonas fluorescens | 160,000 | TNTC | TNTC | 103 | 25 |
| Streptococcus lactis | 105,000 | 44 | 5 | 4 | 1 |
| COMPOUND: N-BROMO-N-CHLORO-DIMETHYL-HYDANTOIN | | | | | |
| E. coli | 150,000 | 264 | 137 | 85 | 23 |
| Bucal streptococcus | 165,000 | 173 | 119 | 75 | 43 |
| Bacillus subtilis | 250,000 | TNTC | TNTC | 336 | 169 |
| Pseudomonas fluorescens | 160,000 | TNTC | 544 | 36 | 12 |
| Streptococcus lactis | 105,000 | 0 | 0 | 0 | 0 |

A modification of the Weber-Black method (Am. J. Public Health 38, 1405–1417) of determining the germicidal activity of chlorine compounds was employed. This procedure was as follows: A 24-hour lauryl tryptose broth culture of the bacterium was diluted in buffered water to give approximately 1,000,000 organisms per ml. One ml. of this dilution was transferred to a seeding pot containing 9 ml. of the test halogen solution, thereby giving a bacterial population subject to the halogen attack of approximately 100,000 organisms per ml. The seeding pot was in a water bath at 25° C. and at intervals of 15, 30, 60, and 120 seconds 1 ml. was transferred from the seeding pot to tubes containing 9 ml. of 0.25% thiosulfate neutralizer. The effect of the thiosulfate neutralizer is to terminate the bacterial destruction by removal of active halogen so that the population remains substantially static at the end of the selected time intervals. From these tubes, standard plate counts are made and the plates incubated 48 hours at 37° C.

Under the conditions of the described test, an effective bactericide should reduce the count to less than .2% within a minute. Where less than 99% of the organisms were destroyed, the plate counts were read as TNTC (too numerous to count).

Where a figure is shown, it indicates over 99.0% destruction of the organisms. For purposes of comparison, values were compiled using sodium hypochlorite as the germicidal agent. Where the rate of kill was studied "under protein demand" 30 p.p.m. peptone was added to the halogen test solution.

Bacterial strains were selected which were non-pathogenic, but which represented broad classes of pathogenic organisms which might be found in contaminated waters.

Table II dramatically illustrates the superior disinfecting properties of an N-halogenated dimethyl hydantoin containing both bromine and chlorine. It was confirmed that an N-chlorinated organic carrier such as N,N-dichloro-dimethyl-hydantoin is a poor germicide. It is also to be noted that the effectiveness of sodium hypochlorite is much reduced under conditions of protein contamination. Both the N,N-dibromo- and N-bromo-N-chloro-dimethyl-hydantoin have high germicidal activity. However, in each instance, the N-brominated-N-chlorinated compound reduced the bacterial population more rapidly and completely than the dibromo- compound. Even with the disinfectant-resistant Bacillus subtilis the kill exceeded 99.8% within one minute.

Disinfecting requirements vary with the type and intended use of the water. For instance, in treating municipal water supplies, holding reservoirs are usually provided, wherein water may be contacted with chlorine for any predetermined length of time to provide a satisfactory bacterial kill. However, when it is desired to drink water directly from a contaminated source, the amount of chlorine required for quick kill results in a very undesirable taste problem.

*Example 1*

One quart of contaminated pond water was treated with two quickly-soluble tablets, each containing 8 mgm. of p(N-bromo-N-chloro-sulfamyl) benzoic acid. The free residual halogen concentration in the water at the end of a two-minute interval was 2.2 p.p.m. A plate count as determined on the water at the end of the two-minute interval showed the water to be sterile. The water was safely consumed after a hold-time of 2 to 3 minutes.

Contaminated well water was similarly treated with quickly-soluble tablets of N-bromo-N-chloro-dimethyl-hydantoin to provide a residual halogen concentration of 3 p.p.m. Such water was consumed immediately upon complete dissolution of the tablets. Plate counts showed the water to be sterile at the end of 2 minutes, to be E. coli-free at the end of 30 seconds.

The disinfection of swimming pool water presents another problem. To prevent cross-infection between swimmers, a rapid bacterial kill is essential. However, when a swimming pool is in use, the introduction of nitrogenous contamination in the form of urea and body protein is continuous. These contaminants tend to combine with chlorine to form the slow-acting chloramines. As has been shown in Table I, organic halogen carriers or mixtures of carriers which provide active bromine and chlorine release both halogens very rapidly in water, even under protein demand. Their excellent germicidal properties in protein-contaminated water make them the disinfectants of choice in the treatment of swimming pool water.

*Example 2*

Into a 100,000-gallon capacity swimming pool provided with a recirculation system, a mixture containing one part N,N-dibromo-dimethyl-hydantoin and 3 parts N,N-dichloro-dimethyl-hydantoin was fed continuously by means of an appropriate powder feeder. The feed rate was such that the pool water was maintained at a free halogen residual of 1 to 3 p.p.m. as determined on an ortho-tolidine test kit calibrated for bromine. Water samples were taken periodically during active swimming. The water remained E. coli-free and plate counts never exceeded 30 organisms per ml.

Swimming pool waters were also disinfected in the manner of Example 2, using sodium N-bromo-N-chloro-cyanurate, potassium N-bromo-N-chloro-cyanurate, N-bromo - N - chloro - dimethyl - hydantoin, N,N - di-bromo-N,N-dichloro-7,8-dimethyl - glycoluril, N - mono-bromo-N,N-dichloro-7,8-dimethyl-glycoluril, N,N - di-lower alkyl-N,Nαα trichloro-N-bromo-malonamide, a mixture of sodium N,N-dichloro - cyanurate with N,N-di-bromo-dimethyl-hydantoin, a mixture of N,N,N-tribromo-7,8-dimethyl-glycoluril with N,N-dichloro-dimethyl - hydantoin and a mixture of N,N-dibromo-5-spiro-hydantoin with sodium N,N-dichloro-cyanurate. In all cases water samples were checked bacteriologically, as in Example 2, and were found to meet Health Department requirements for swimming pool water.

N-halogenated organic compounds which provide both active chlorine and bromine may be added intermittently to the swimming pool water by hand-feed where no pumping system exists. They may be used in the form of slowly-soluble agglomerates as described in co-pending application Serial No. 6,052. Where an N-brominated organic compound and an N-chlorinated organic compound are used as the active halogen source, the components may be added to the water separately or in admixture.

N-halogenated organic compositions providing both chlorine and bromine may also be used to advantage in the preparation of more concentrated disinfecting rinse solutions for bars, restaurants, hospitals, dairy farms, and the many other applications where disinfection is required.

*Example 3*

A disinfecting rinse solution was prepared for use in a bar by adding 1 gram of powdered N,N-dichloro-N,N-dibromo-7,8-dimethyl-glycoluril in a water-soluble envelope to 3 gallons of water. The treated glassware was sterile as determined by a swab test.

*Example 4*

A detergent solution containing .1% of sodium N-bromo-N-chloro-cyanuric acid was used in washing down hospital walls. The use of solutions of such compounds have the advantage that they tend to deposit a thin film of the halogenated carrier compound, which continues to maintain the treated surface in a bacteria-free condition.

It is to be realized that the greater bactericidal properties of my compositions depend on the presence of N-bromo- and N-chloro-radicals which will provide both active bromine and active chlorine to water. Any of the N-halogenated organic compounds or combinations of such compounds which meet this requirement are suitable for the purpose. A single N-brominated -N- chlorinated organic compound may be used, or two or more N-halogenated organic compounds blended for the purpose. Even where the N-halogenated organic compounds have an extremely low absolute solubility, such as N-bromo-N-chloro-diphenyl-hydantoin, and the N-bromo- and N-chloro-phthalimides, the halogen was shown to be immediately released in an amount up to the solubility limits of the halogenated organic carrier compound being used.

I claim:

1. The process of disinfecting water comprising treating water with an active halogen-releasing composition containing an organo-N-brominated compound in admixture with an organo-N-chlorinated compound.

2. The process of disinfecting water comprising treating water with an active halogen-releasing composition containing an organo-N-brominated-N-chlorinated compound.

3. The method of disinfecting water comprising treating the water with organo-N-halogenated compositions releasing bath active bromine and active chlorine in water, such compositions having as an active halogen-releasing agent an N-halogenated acid amide of the structure

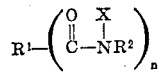

wherein $n$ is an integer from 1 to 4, $R^1$ is a 1 to 16 carbon atom hydrocarbon radical of the group consisting of alkyl and saturated and unsaturated monocyclic hydrocarbon radicals having 5 to 6 carbon atoms per cycle, all of which radicals may be substituted with lower alkyl, lower alkoxy, lower acyl, halogen, carboxy and sulfonic acid groups, $R^2$ is a radical of the group consisting of hydrogen, lower alkyl, and lower acyl, X is a halogen of the group consisting of bromine and chlorine, and salts thereof.

4. The method of disinfecting water comprising treating the water with organo-N-halogenated compositions releasing both active bromine and active chlorine in water, such compositions having as an active halogen-releasing agent an N-halogenated imide of the structure

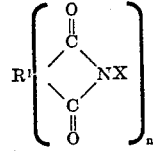

wherein $n$ is an integer from 1 to 2, $R^1$ is a 1 to 16 carbon atom hydrocarbon radical of the group consisting of alkyl and saturated and unsaturated monocyclic hydrocarbon radicals having 5 to 6 carbon atoms per cycle, all of which radicals may be substituted with lower alkyl, lower alkoxy, lower acyl, halogen, carboxy and sulfonic acid groups, and X is a halogen of the group consisting of bromine and chlorine.

5. The method of disinfecting water comprising treating water with organo-N-halogenated compositions releasing both active bromine and active chlorine in water, such compositions having as an active halogen-releasing agent an N-halogenated sulfonamide of the structure

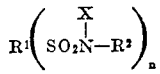

wherein $n$ is an integer from 1 to 2, $R^1$ is a 1 to 16 carbon atom hydrocarbon radical of the group consisting of alkyl and saturated and unsaturated monocyclic hydrocarbon radicals having 5 to 6 carbon atoms per cycle, all of which radicals may be substituted with lower alkyl, lower alkoxy, lower acyl, halogen, carboxy and sulfonic acid groups, $R^2$ is a radical of the group consisting of hydrogen bromine, chlorine, lower alkyl, and lower acyl, X is a halogen of the group consisting of bromine and chlorine, and salts thereof.

6. The method of disinfecting water comprising treating the water with organo-N-halogenated compositions releasing both active bromine and active chlorine in water, such compositions having as an active halogen-releasing agent an N-halogenated amidine of the structure

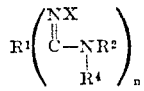

wherein $n$ is an integer from 1 to 2, $R^1$ is a 1 to 16 carbon atom hydrocarbon radical of the group consisting of alkyl and saturated and unsaturated monocyclic hydrocarbon radicals having 5 to 6 carbon atoms per cycle, all of which radicals may be substituted with lower alkyl, lower alkoxy, lower acyl, halogen, carboxy and sulfonic acid groups, $R^2$ is a radical of the group consisting of hydrogen, lower alkyl, and lower acyl, $R^4$ is a radical of the group consisting of hydrogen, lower alkyl, lower acyl bromine and chlorine, and X is a halogen of the group consisting of bromine and chlorine and salts thereof.

7. The method of disinfecting water comprising treating the water with organo-N-halogenated compositions releasing both active bromine and active chlorine in water, such compositions having as an active halogen-releasing agent an N-halogenated imidate of the structure

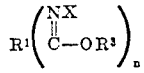

wherein $n$ is an integer from 1 to 2, $R^1$ is a 1 to 16 carbon atom hydrocarbon radical of the group consisting of alkyl and saturated and unsaturated monocyclic hydrocarbon radicals having 5 to 6 carbon atoms per cycle, all of which cyclic radicals may be substituted with lower alkyl, lower alkoxy, lower acyl, halogen, carboxy and sulfonic acid groups, $R^3$ is a radical of the group consisting of lower alkyl, and monocyclic aryl radical having 5 to 6 carbon atoms per cycle, and X is a halogen of the group consisting of bromine and chlorine.

8. The method of disinfecting water comprising treating the water with organo-N-halogenated compositions releasing both active bromine and active chlorine in water, such compositions having as an active halogen-releasing agent an N-halogenated-5-hydrocarbon-substituted hydantoin of the structure

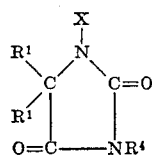

wherein $R^1$ is a 1 to 16 carbon atom hydrocarbon radical of the group consisting of alkyl and saturated and unsaturated monocyclic hydrocarbon radicals having 5 to 6 carbon atoms per cycle, all of which radicals may be substituted with lower alkyl, lower alkoxy, lower acyl, halogen, carboxy and sulfonic acid groups, $R^4$ is a radical of the group consisting of hydrogen, lower alkyl, lower acyl bromine and chlorine, and X is a halogen of the group consisting of bromine and chlorine, and salts thereof.

9. The method of disinfecting water comprising treating the water with organo-N-halogenated compositions releasing both active bromine and active chlorine in water, such compositions having as an active halogen-releasing agent an N-halogenated amidine of carbonic acid of the structure

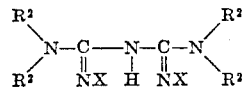

wherein $R^2$ is a radical of the group consisting of hydrogen, lower alkyl, lower acyl and monocyclic aryl radical having 5 to 6 carbon atoms per cycle, and X is a halogen of the group consisting of bromine and chlorine, and the acid-addition salts thereof.

10. The method of disinfecting water comprising treating the water with organo-N-halogenated compositions releasing both active bromine and active chlorine in water, such compositions having as an active halogen-releasing agent an N-halogenated amidine of carbonic acid of the structure

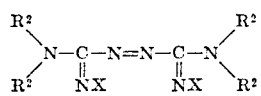

wherein $R^2$ is a radical of the group consisting of hydrogen, lower alkyl, lower acyl and monocyclic aryl radical having 5 to 6 carbon atoms per cycle, and X is a halogen of the group consisting of bromine and chlorine, and the acid-addition salts thereof.

11. The method of disinfecting water comprising treating the water with organo-N-halogenated compositions releasing both active bromine and active chlorine in water, such compositions having as an active halogen-releasing agent an N-halogenated-2,5-diimino glycoluril of the structure

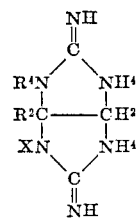

wherein $R^2$ is a radical of the group consisting of hydrogen, lower alkyl, lower acyl, and monocyclic aryl radical having 5 to 6 carbon atoms per cycle, which radical may be substituted with lower alkyl, lower acyl, halogen, carboxy and sulfonic acid groups, $R^4$ is a radical of the group consisting of hydrogen, chlorine and bromine, X is a halogen of the group consisting of bromine and chlorine, and salts thereof.

12. The method of disinfecting water comprising treating the water with organo-N-halogenated compositions releasing both active bromine and active chlorine in water, such compositions having as an active halogen-releasing agent an N-halogenated-N-hydrocarbon substituted urea of the structure

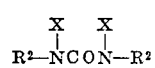

wherein $R^2$ is a radical of the group consisting of lower alkyl, lower acyl, and monocyclic aryl radical having 5 to 6 carbon atoms per cycle, and X is a halogen of the group consisting of bromine and chlorine.

13. The method of disinfecting water comprising treating the water with organo-N-halogenated compositions releasing both active bromine and active chlorine in water, such compositions having as an active halogen-releasing agent an N-halogenated-glycoluril of the structure

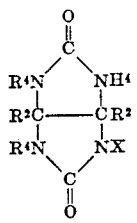

wherein R² is a radical of the group consisting of hydrogen, lower alkyl, lower acyl, and monocyclic aryl radical having 5 to 6 carbon atoms per cycle, which radical may be substituted with lower alkyl, lower acyl, halogen, carboxy, and sulfonic acid groups, R⁴ is a radical of the group consisting of hydrogen, bromine and chlorine, X is a halogen of the group consisting of bromine and chlorine, and salts thereof.

14. The method of disinfecting water comprising treating the water with organo-N-halogenated compositions releasing both active bromine and active chlorine in water, such compositions having as an active halogen-releasing agent an N-halogenated melamine of the structure

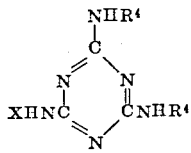

wherein R⁴ is a radical of the group consisting of hydrogen, chlorine and bromine, X is a halogen of the group consisting of bromine and chlorine, and acid-addition salts thereof.

15. The method of disinfecting water comprising treating the water with organo-N-halogenated compositions releasing both active bromine and active chlorine in water, such compositions having as an active halogen-releasing agent an N-halogenated-αα-dichloromalonamide of the structure

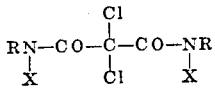

wherein R is a lower alkyl radical having up to 6 carbon atoms and X is a halogen of the group consisting of bromine and chlorine.

16. The method of disinfecting water comprising treating the water with N-bromo-N¹-chloro-pyromellitic-diimide.

17. The method of disinfecting water comprising treating the water with p(N-bromo-N-chloro-sulfamyl)-benzoic acid, and salts thereof.

18. The method of disinfecting water comprising treating the water with N-bromo-N¹-chloro-toluene-2,4-disulfonamide, and salts thereof.

19. The method of disinfecting water comprising treating the water with an N-bromo-N¹-chloro-succindiamidine of the structure

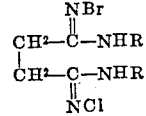

wherein each R group is selected from the group consisting of hydrogen, lower alkyl radical having up to 6 carbon atoms, lower acyl radical having up to 6 carbon atoms and a monocyclic aryl radical, and their acid-addition salts.

20. The method of disinfecting water comprising treating the water with an N-bromo-N¹-chloro-biguanide of the structure

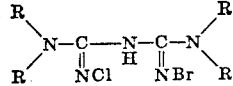

wherein each R group is selected from the group consisting of hydrogen, lower alkyl radical having up to 6 carbon atoms, lower acyl radical having up to 6 carbon atoms and monocyclic aryl radical, and their acid-addition salts.

21. The method of disinfecting water comprising treating the water with an N-bromo-N¹-chloro-azodicarbonamidine of the structure

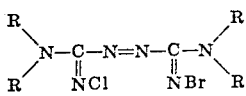

wherein each R group is selected from the group consisting of hydrogen, lower alkyl radical having up to 6 carbon atoms, lower acyl radical having up to 6 carbon atoms and monocyclic aryl radical, and their acid-addition salts.

22. The method of disinfecting water comprising treating the water with an N-bromo-N-chloro-5-substituted hydantoin of the structure

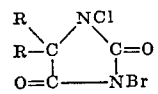

wherein each R group is selected from the group consisting of hydrogen, lower alkyl radical having up to 6 carbon atoms, lower acyl radical having up to 6 carbon atoms and monocyclic aryl radical having 5 to 6 carbon atoms per cycle, all of which radicals may be substituted with bromine, chlorine, carboxy and sulfonic acid groups, and salts thereof.

23. The method of disinfecting water comprising treating the water with an N-brominated-N-chlorinated cyanuric acid, and salts thereof.

24. The method of disinfecting water comprising treating the water with N-brominated-N-chlorinated triethylene diamine.

25. The method of disinfecting water comprising treating the water with an N-halogenated N-hydrocarbon-substituted urea, at least a portion of the N-halogen radicals consisting of N-chloro and another portion of the N-halogen radicals consisting of N-bromo.

26. The process of claim 1 wherein the treating agent is added to water in excess of the minimum required to disinfect the water.

27. The process of claim 2 wherein the treating agent is added to water in excess of the minimum required to disinfect the water.

References Cited in the file of this patent
UNITED STATES PATENTS

| | | |
|---|---|---|
| 2,130,805 | Levine | Sept. 20, 1938 |
| 2,580,808 | Marks et al. | Jan. 1, 1952 |
| 2,662,855 | Kamlet | Dec. 15, 1953 |
| 2,779,764 | Paterson | Jan. 29, 1957 |
| 2,789,078 | Trusler | Apr. 16, 1957 |
| 2,868,787 | Paterson | Jan. 13, 1959 |